United States Patent
Iizuka et al.

(10) Patent No.: US 10,415,644 B2
(45) Date of Patent: Sep. 17, 2019

(54) ROTARY MACHINE

(71) Applicant: IHI Corporation, Koto-ku (JP)

(72) Inventors: Kuniaki Iizuka, Koto-ku (JP); Takashi Yoshida, Koto-ku (JP); Tatsumi Inomata, Koto-ku (JP); Takuya Ozasa, Koto-ku (JP); Kouta Kimachi, Koto-ku (JP)

(73) Assignee: IHI Corporation, Koto-ku (JP)

( * ) Notice: Subject to any disclaimer, the term of this patent is extended or adjusted under 35 U.S.C. 154(b) by 0 days.

(21) Appl. No.: 15/576,377

(22) PCT Filed: Jun. 8, 2016

(86) PCT No.: PCT/JP2016/067104
§ 371 (c)(1),
(2) Date: Nov. 22, 2017

(87) PCT Pub. No.: WO2016/199822
PCT Pub. Date: Dec. 15, 2016

(65) Prior Publication Data
US 2018/0156280 A1    Jun. 7, 2018

(30) Foreign Application Priority Data
Jun. 11, 2015  (JP) ................................. 2015-118060

(51) Int. Cl.
*F16C 35/07*   (2006.01)
*F16C 35/06*   (2006.01)
(Continued)

(52) U.S. Cl.
CPC .......... *F16C 35/077* (2013.01); *F04D 29/053* (2013.01); *F04D 29/056* (2013.01);
(Continued)

(58) Field of Classification Search
CPC ...... F16C 35/063; F16C 35/07; F16C 35/077; F16C 2360/24; F02B 39/10; F04D 29/053; F04D 29/056; Y02T 10/144
See application file for complete search history.

(56) References Cited

U.S. PATENT DOCUMENTS 4,226,485 A * 10/1980 Pruvot .................... F16C 27/04
384/557
4,992,686 A   2/1991 Heine et al.
(Continued)

FOREIGN PATENT DOCUMENTS

| CN | 101460724 A | 6/2009 |
| JP | 1-238444 A | 9/1989 |

(Continued)

OTHER PUBLICATIONS

International Search Report dated Aug. 23, 2016, in PCT/JP2016/067104 filed Jun. 8, 2016.

*Primary Examiner* — Alan B Waits
(74) *Attorney, Agent, or Firm* — Oblon, McClelland, Maier & Neustadt, L.L.P.

(57) ABSTRACT

A rotary machine includes rotating shaft supported with respect to an end wall of a housing. The rotary machine includes a bearing that is attached to the rotating shaft and rotatably supports the rotating shaft to the housing, a cylindrical holding portion that is provided in the end wall of the housing and extends in an axial direction of the rotating shaft, and a cylindrical bearing sleeve that is fixed to the holding portion and surrounds the bearing. The bearing sleeve includes a surrounding portion that surrounds the bearing and a protruding portion that protrudes from the surrounding portion toward the end wall. The protruding portion and the holding portion overlap each other in a radial direction of the rotating shaft, and the bearing sleeve is fixed (Continued)

to the end wall by fitting the protruding portion into the holding portion.

9 Claims, 4 Drawing Sheets

(51) Int. Cl.
*F04D 29/05* (2006.01)
*F16C 35/077* (2006.01)
*F16C 35/063* (2006.01)
*F04D 29/053* (2006.01)
*F04D 29/056* (2006.01)
*F02B 39/10* (2006.01)

(52) U.S. Cl.
CPC ............ *F16C 35/063* (2013.01); *F02B 39/10* (2013.01); *F16C 2360/24* (2013.01)

(56) References Cited

U.S. PATENT DOCUMENTS

| | | | | |
|---|---|---|---|---|
| 5,073,039 A | * | 12/1991 | Shervington | F16C 19/525 |
| | | | | 384/278 |
| 5,138,209 A | | 8/1992 | Chuta et al. | |
| 5,598,747 A | * | 2/1997 | Schetter | F16C 19/52 |
| | | | | 384/557 |
| 5,857,782 A | * | 1/1999 | Waskiewicz | F16C 23/084 |
| | | | | 384/493 |
| 2004/0160138 A1 | * | 8/2004 | Kuroda | H02K 5/1732 |
| | | | | 310/90 |
| 2007/0278874 A1 | * | 12/2007 | Abousleiman | F02C 7/32 |
| | | | | 310/71 |
| 2009/0142010 A1 | | 6/2009 | Ito et al. | |
| 2010/0218499 A1 | | 9/2010 | Shibui et al. | |
| 2013/0220285 A1 | | 8/2013 | Hayashi et al. | |
| 2014/0090626 A1 | | 4/2014 | An et al. | |
| 2014/0334756 A1 | * | 11/2014 | Krug | F16C 19/364 |
| | | | | 384/462 |
| 2014/0354097 A1 | * | 12/2014 | Tanaka | H02K 5/1732 |
| | | | | 310/90 |
| 2015/0055907 A1 | * | 2/2015 | Evans | F16C 25/08 |
| | | | | 384/569 |
| 2015/0155754 A1 | * | 6/2015 | Ohashi | H02K 5/1732 |
| | | | | 310/90 |
| 2015/0308504 A1 | * | 10/2015 | Katsaros | F16C 25/08 |
| | | | | 384/125 |
| 2016/0056680 A1 | * | 2/2016 | Tanaka | H02K 5/16 |
| | | | | 310/43 |
| 2017/0159714 A1 | * | 6/2017 | Lemmers, Jr. | F16C 35/042 |

FOREIGN PATENT DOCUMENTS

| | | |
|---|---|---|
| JP | 3-503563 A | 8/1991 |
| JP | H3-285545 | 12/1991 |
| JP | 4-161033 A | 6/1992 |
| JP | H11-315799 A | 11/1999 |
| JP | 2001-303964 A | 10/2001 |
| JP | 2009-275291 A | 11/2009 |
| JP | 2011-52550 A | 3/2011 |
| JP | 2011-58542 A | 3/2011 |
| JP | 2012-102700 A | 5/2012 |
| JP | 2013-24059 A | 2/2013 |

* cited by examiner

ROTARY MACHINE

TECHNICAL FIELD

This disclosure relates to a rotary machine in which a rotating shaft is supported by a bearing.

BACKGROUND ART

As such a technology, as described in Patent Document 1, an electric supercharger in which a compressor wheel is attached to a rotating shaft and a motor rotor fixed to the rotating shaft is rotated by a motor is known. In the electric supercharger, a ring portion that surrounds the rotating shaft, and a damper and a rolling bearing provided inside the ring portion are provided. The ring portion is attached to the inside of a casing. The damper has a seal such as an O-ring provided on the outer circumferential surface of the rolling bearing, and the outer circumferential surface of the seal is in contact with the inner circumferential surface of the ring portion. The ring portion supports the damper in the radial direction of the rotating shaft.

CITATION LIST

Patent Literature

Patent Document 1: Japanese Unexamined Patent Publication No. 2012-102700

SUMMARY OF INVENTION

Technical Problem

In the above-described structure in the related art, the damper is provided on the outer circumferential side of the rolling bearing, and the ring portion is provided on the further outer circumferential side of the damper. As described above, since a plurality of members is arranged on the outside of the bearing in the radial direction of the rotating shaft, it is difficult to secure a space on the outside in the radial direction.

In addition, for example, a structure as illustrated in FIG. 4 is considered. In a bearing structure 100 illustrated in FIG. 4, an inner race 120a of a ball bearing 120 is press-fitted to a base end portion 12b of a rotating shaft 12. An outer race 120b of the ball bearing 120 is typically made of steel such as SUJ. On the other hand, a bearing flange 104 is provided at one end in the axial direction of a housing, and the bearing flange 104 is provided with a cylindrical portion 105 that protrudes inward. The bearing flange 104 and the cylindrical portion 105 are made of, for example, aluminum for a reduction in weight. In a case where there is a difference between the hardness of the outer race 120b of the ball bearing 120 and the hardness of the cylindrical portion 105, when the outer race 120b is clearance-fitted into the cylindrical portion 105, the cylindrical portion 105 easily wears. Here, a bearing sleeve 122 having the same degree of hardness as the outer race 120b is fitted into the cylindrical portion 105, and the outer race 120b is clearance-fitted to the inner circumferential side of the cylindrical portion 105.

In the bearing structure 100 of FIG. 4, the cylindrical portion 105 surrounds the bearing sleeve 122 and the ball bearing 120. Therefore, on the outside of the ball bearing 120, a space in the radial direction corresponding to the sum of the thickness of the bearing sleeve 122 and the thickness of the cylindrical portion 105 is occupied. On the outer circumferential side of the cylindrical portion 105, for example, a motor stator may be disposed. However, there is only a limited space. Accordingly, it is disadvantageous in terms of layout. This disclosure describes a rotary machine capable of securing a space on the outside of a bearing in the radial direction of a rotating shaft.

Solution to Problem

According to an aspect of this disclosure, a rotary machine includes: a rotating shaft supported with respect to an end wall of a housing; a bearing which is attached to the rotating shaft and rotatably supports the rotating shaft to the housing; a cylindrical holding portion which is provided in the end wall of the housing and extends in an axial direction of the rotating shaft; and a cylindrical bearing sleeve which is fixed to the holding portion and surrounds the bearing, in which the bearing sleeve includes a surrounding portion that surrounds the bearing and a protruding portion that protrudes from the surrounding portion toward the end wall, and the protruding portion and the holding portion overlap each other in a radial direction of the rotating shaft, and the bearing sleeve is fixed to the end wall by fitting the protruding portion into the holding portion.

Effects of Invention

According to the aspect of this disclosure, a space on the outside of the bearing can be secured in the radial direction of the rotating shaft.

DESCRIPTION OF EMBODIMENTS

Figure 1:
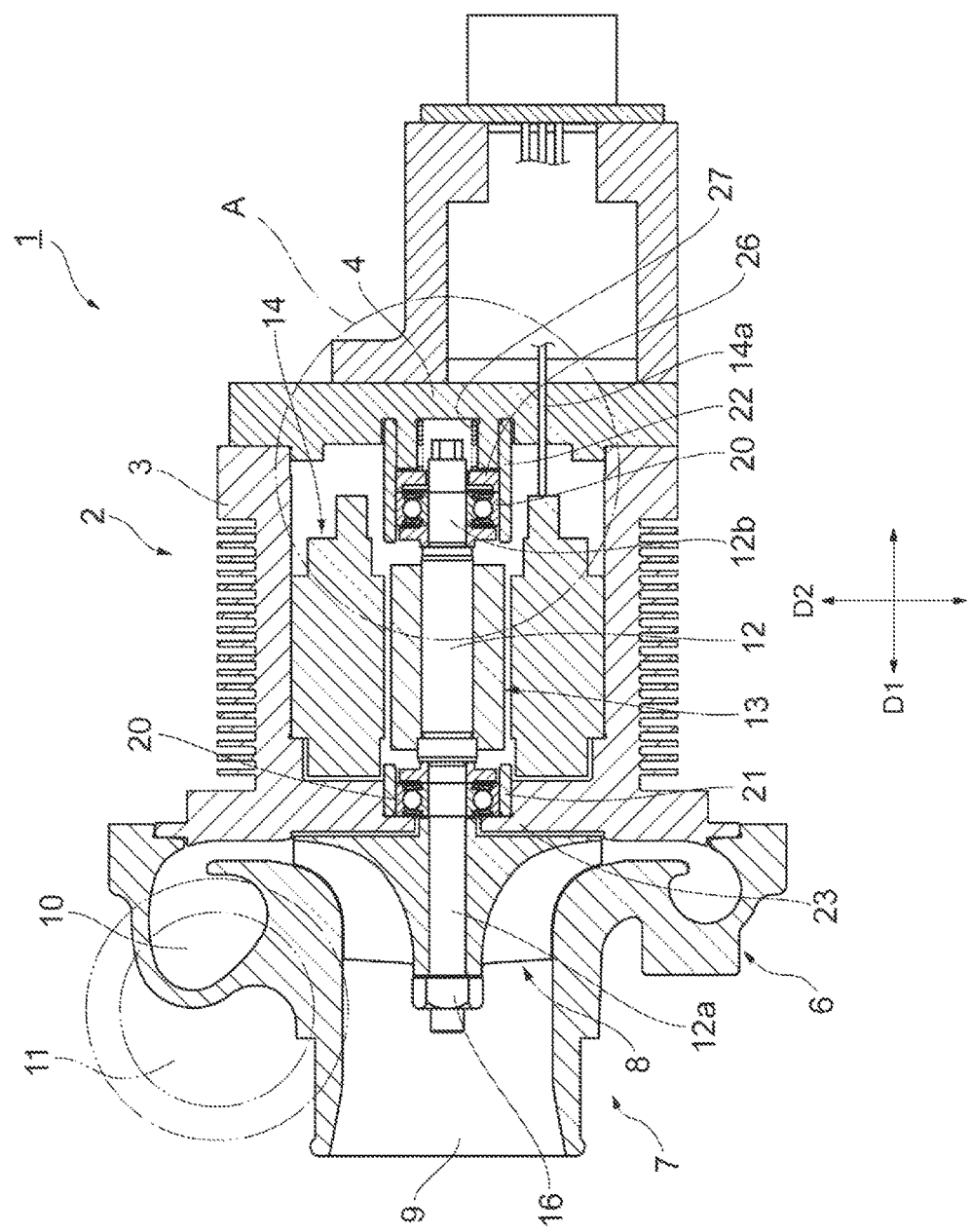
FIG. 1 is a sectional view of a rotary machine according to a first embodiment of this disclosure.

According to an aspect of this disclosure, a rotary machine includes: a rotating shaft supported with respect to an end wall of a housing; a bearing which is attached to the rotating shaft and rotatably supports the rotating shaft to the housing; a cylindrical holding portion which is provided in the end wall of the housing and extends in an axial direction of the rotating shaft; and a cylindrical bearing sleeve which is fixed to the holding portion and surrounds the bearing, in which the bearing sleeve includes a surrounding portion that surrounds the bearing and a protruding portion that protrudes from the surrounding portion toward the end wall, and the protruding portion and the holding portion overlap each other in a radial direction of the rotating shaft, and the bearing sleeve is fixed to the end wall by fitting the protruding portion into the holding portion.

In the rotary machine, the bearing sleeve includes the protruding portion protruding toward the end wall of the housing, and the bearing sleeve is fixed by fitting the protruding portion into the holding portion. As described above, the protruding portion protruding toward the end wall is provided separately from the surrounding portion surrounding the bearing, and the protruding portion is fitted into the holding portion. Therefore, the bearing sleeve and the holding portion do not overlap each other on the outside in the radial direction of the bearing, and a space on the outside of the bearing is secured.

In some aspects, the coefficient of linear expansion of the bearing sleeve is different from the coefficient of linear expansion of the holding portion, and one of the protruding portion and the holding portion having a larger coefficient of linear expansion is disposed on the inside in the radial direction. With this configuration, during an operation of the rotary machine, even when the protruding portion and the holding portion thermally expand due to a rise in the internal temperature, since the one having a larger coefficient of linear expansion is disposed on the inside in the radial direction, the interference in the fit between the protruding portion and the holding portion is increased. Therefore, the bearing sleeve is prevented from coming off.

In some aspects, the hardness of the bearing sleeve is at the same degree of hardness as the outer circumferential portion of the bearing. With this configuration, the wear amount of the inner circumferential surface of the bearing sleeve that comes into contact with the bearing can be reduced.

Hereinafter, an embodiment of this disclosure will be described with reference to the drawings. In the description of the drawings, like elements are denoted by like reference numerals, and redundant descriptions will be omitted.

An electric supercharger (rotary machine) 1 according to a first embodiment will be described with reference to FIG. 1. As illustrated in FIG. 1, the electric supercharger 1 is applied to, for example, an internal combustion engine of a vehicle or a ship. The electric supercharger 1 includes a compressor 7. In the electric supercharger 1, a compressor impeller 8 is rotated by the interaction between a rotor portion 13 and a stator portion 14 to compress a fluid such as air and generate compressed air.

The electric supercharger 1 includes a rotating shaft 12 rotatably supported in a housing 2 and the compressor impeller 8 fixed to a tip end portion (one end portion) 12*a* of the rotating shaft 12. The housing 2 includes a motor housing 3 in which the rotor portion 13 and the stator portion 14 are stored, and an end wall 4 that closes an opening on the other end side (the right side in the figure) of the motor housing 3. A compressor housing 6 in which the compressor impeller 8 is stored is provided on one end side (the left side in the figure) of the motor housing 3. The compressor housing 6 includes an intake port 9, a scroll portion 10, and a discharge port 11.

The compressor impeller 8 is made of, for example, a resin or carbon fiber reinforced resin (hereinafter, referred to as "CFRP", CFRP: Carbon Fiber Reinforced Plastic), and thus a reduction in weight is achieved.

The rotor portion 13 is fixed to the center portion in an axial direction D1 of the rotating shaft 12 and includes one or a plurality of permanent magnets (not illustrated) attached to the rotating shaft 12. The stator portion 14 is fixed to the inner surface of the motor housing 3 so as to surround the rotor portion 13, and includes a coil portion (not illustrated) having a lead wire 14*a* wound thereon. When an alternating current is supplied to the coil portion of the stator portion 14 through the lead wire 14*a*, the rotating shaft 12 and the compressor impeller 8 rotate integrally due to the interaction between the rotor portion 13 and the stator portion 14. When the compressor impeller 8 rotates, the compressor impeller 8 draws outside air through the intake port 9, compresses the air through the scroll portion 10, and discharges the air from the discharge port 11. The compressed air discharged from the discharge port 11 is supplied to the internal combustion engine mentioned above.

Figure 2:
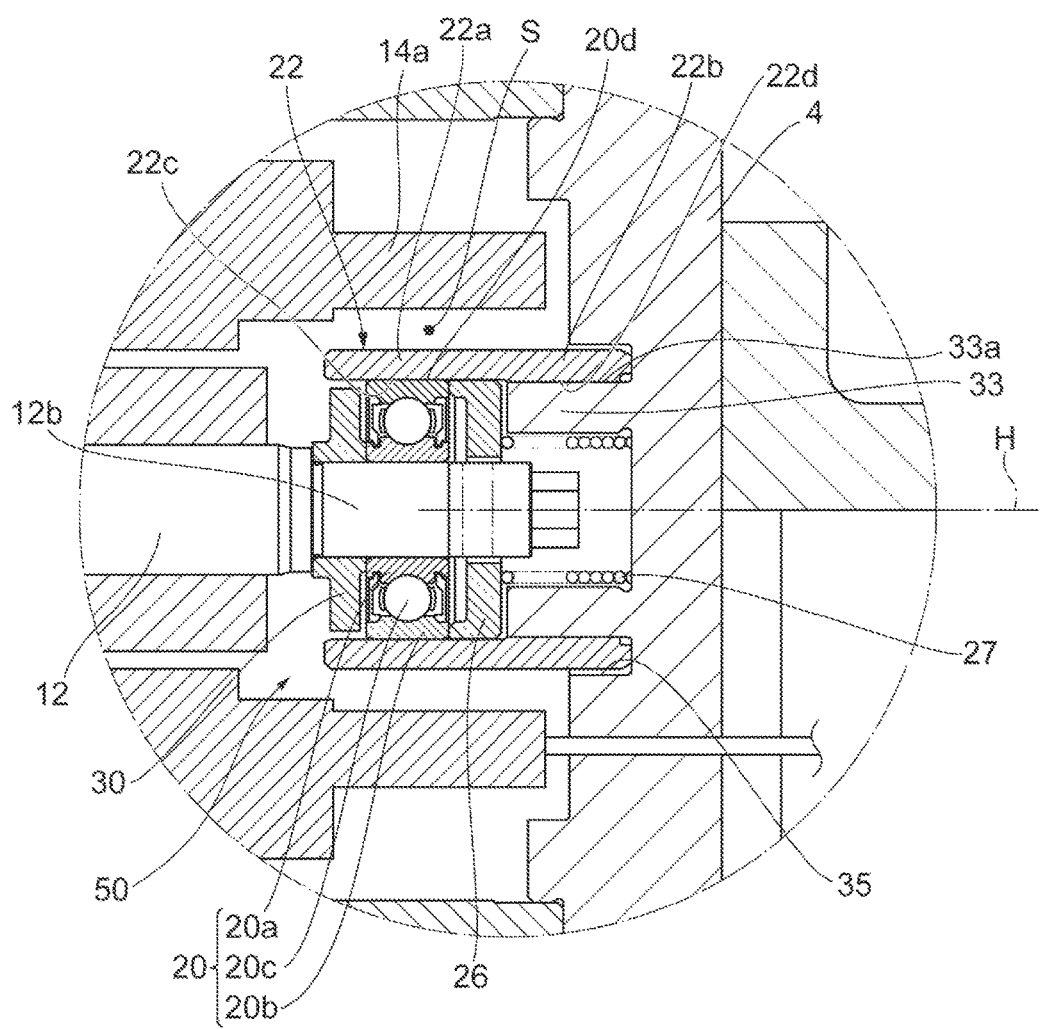
FIG. 2 is an enlarged sectional view of the part A in FIG. 1.

The electric supercharger 1 includes two ball bearings (bearings) 20 that are press-fitted to the rotating shaft 12 and rotatably support the rotating shaft 12 to the housing 2. The ball bearings 20 are respectively provided near the tip end portion 12*a* and the base end portion 12*b* of the rotating shaft 12, and support the rotating shaft 12 at both sides. The ball bearing 20 is, for example, a grease lubrication type radial ball bearing. More specifically, the ball bearing 20 may be a deep groove ball bearing or an angular contact ball bearing. As illustrated in FIG. 2, the ball bearing 20 includes an inner race 20*a* press-fitted to the rotating shaft 12 and an outer race 20*b* that is rotatable relative to the inner race 20*a* via a plurality of balls 20*c*.

One ball bearing 20 is attached to the rear surface side (the right side in the figure) of the compressor impeller 8. A cylindrical bearing sleeve 21 is attached to the outer circumferential side of one ball bearing 20. As illustrated in FIG. 1, the ball bearing 20 is fixed to the rotating shaft 12 by a shaft end nut 16 provided at the tip end portion 12*a* of the rotating shaft 12. The bearing sleeve 21 is press-fitted into a bearing surrounding portion 23 formed on one end side in the axial direction D1 of the motor housing 3.

The other ball bearing 20 is attached between the rotating shaft 12 and the end wall 4. The end wall 4 is a so-called bearing flange. A cylindrical bearing sleeve 22 is attached to the outer circumferential side of the other ball bearing 20. The bearing sleeve 22 is fixed to a cylindrical holding portion 33 (see FIG. 2) formed to protrude inward from the center of the end wall 4 in the motor housing 3. An annular spring receiver 26 is provided between the other ball bearing 20 and the end wall 4. The spring receiver 26 is biased toward one side in the axial direction D1 by a spring 27 disposed in the holding portion 33 at the center of the end wall 4. A circular flange-like spacer 30 (see FIG. 2) is provided on one side (the left side in the drawing) of the other ball bearing 20 in the axial direction D1.

The rotating shaft 12, and the compressor impeller 8, the rotor portion 13, the ball bearings 20, the spacer 30, and the spring receiver 26 fixed to the rotating shaft 12 integrally constitute a rotating section in the housing 2 and are biased toward one side in the axial direction D1. An annular portion of the bearing surrounding portion 23 faces one end side of the ball bearing 20 such that the rotating section is positioned in the axial direction D1.

In the electric supercharger 1, the motor housing 3 is made of, for example, aluminum. On the other hand, the inner race 20*a* and the outer race 20*b* of the ball bearing 20 are made of iron (for example, SUJ). Therefore, the bearing sleeves 21 and 22 which are made of iron such as carbon steel (for example, S45C) and have the same degree of hardness as the ball bearings 20 are provided between the ball bearings 20 and the motor housing 3. The bearing sleeves 21 and 22 surround the ball bearings 20 from the outer circumferential side. Accordingly, the motor housing 3 made of a relatively soft material is protected from wear. The hardness of the inner race 20*a* and the outer race 20*b* of the ball bearing 20 and the bearing sleeves 21 and 22 can be measured with any indicator representing hardness. Examples of the indicator of hardness include Rockwell hardness (HRC) and Vickers hardness (Hv).

Subsequently, the bearing structure at the base end portion 12*b* of the rotating shaft 12 will be described with reference to FIG. 2. As illustrated in FIG. 2, a bearing structure 50 of the electric supercharger 1 supports the rotating shaft 12 with respect to the end wall 4 in the axial direction D1 of the housing 2. The bearing structure 50 includes the ball bearing 20 on the base end portion 12b side, the cylindrical bearing sleeve 22 that holds the outer race 20b of the ball bearing 20, and the holding portion 33 that is provided in the end wall 4 to hold the bearing sleeve 22.

The bearing sleeve 22 includes a cylindrical surrounding portion 22a surrounding the ball bearing 20 and a cylindrical protruding portion 22b protruding from the surrounding portion 22a toward the end wall 4. The surrounding portion 22a and the protruding portion 22b are smoothly continuous and are integrally formed into a cylindrical shape. The outer race 20b of the ball bearing 20 is clearance-fitted into the surrounding portion 22a. An inner circumferential surface 22c of the surrounding portion 22a abuts an outer peripheral surface 20d of the outer race 20b of the ball bearing 20. The surrounding portion 22a protrudes toward one side in the axial direction D1 from the ball bearing 20. The spacer 30 is disposed inside the protruding portion of the surrounding portion 22a.

The cylindrical holding portion 33 is formed around a rotation axis H of the rotating shaft 12 as the center and protrudes in the axial direction D1 of the rotating shaft 12. In other words, the holding portion 33 protrudes toward the ball bearing 20. An outer circumferential surface 33a of the holding portion 33 extends in the axial direction D1. The spring 27 is accommodated in the holding portion 33. The spring receiver 26 is disposed between the holding portion 33 and the ball bearing 20.

An annular groove 35 having the rotation axis H as the center is provided on the outer circumferential side of the holding portion 33. The end portion of the protruding portion 22b is disposed in the groove 35. The protruding portion 22b and the holding portion 33 provided in the end wall 4 overlap each other in a radial direction D2 of the rotating shaft 12. That is, the protruding portion 22b is disposed on the outside in the radial direction D2, and the holding portion 33 is disposed on the inside in the radial direction D2. The bearing sleeve 22 is fixed to the end wall 4 by fitting the protruding portion 22b into the holding portion 33. An inner circumferential surface 22d of the protruding portion 22b comes in pressing contact with the outer circumferential surface 33a of the holding portion 33. The bearing sleeve 22 is press-fitted and fixed to the holding portion 33, for example, by shrink fitting. The holding portion 33 has a thickness and strength required for holding the bearing sleeve 22.

In the electric supercharger 1, during an operation of rotating the rotating shaft 12, the internal temperature rises due to heat generated by the motor, rotational friction of the bearing portions, or the like. The coefficient of linear expansion of the bearing sleeve 22 is different from the coefficient of linear expansion of the holding portion 33 (the end wall 4). More specifically, the coefficient of linear expansion of the bearing sleeve 22 is smaller than the coefficient of linear expansion of the holding portion 33. The holding portion 33 having a larger coefficient of linear expansion is disposed on the inside of the protruding portion 22b in the radial direction D2. As described above, the protruding portion 22b and the holding portion 33 are arranged in an arrangement relationship (the relationship between the inside and the outside) such that the interference therebetween in the radial direction D2 is increased by such a temperature change.

As described above, since the one having a larger coefficient of linear expansion is disposed on the inside in the radial direction D2, during the operation of the electric supercharger 1, even when the protruding portion 22b and the holding portion 33 thermally expand due to the rise in the internal temperature, the interference in the fit is increased by the difference in thermal expansion between the protruding portion 22b and the holding portion 33. This prevents the bearing sleeve 22 from coming off.

Furthermore, as described above, since the hardness of the bearing sleeve 22 is about the same as the hardness of the outer race 20b of the ball bearing 20, even in a case where the inner circumferential surface 22c of the surrounding portion 22a is brought into contact with the outer race 20b, for example, due to vibration and wear occurs, the wear amount of the inner circumferential surface 22c is small.

As described above, in the bearing structure 50, the surrounding portion 22a which is a portion of the bearing sleeve 22 surrounds the ball bearing 20, and the protruding portion 22b which is another portion of the bearing sleeve 22 overlaps and is fixed to the holding portion 33. Therefore, the outer circumferential surface of the surrounding portion 22a is exposed to the internal space of the motor housing 3. This point is advantageous, for example, from the viewpoint of heat dissipation.

Figure 4:
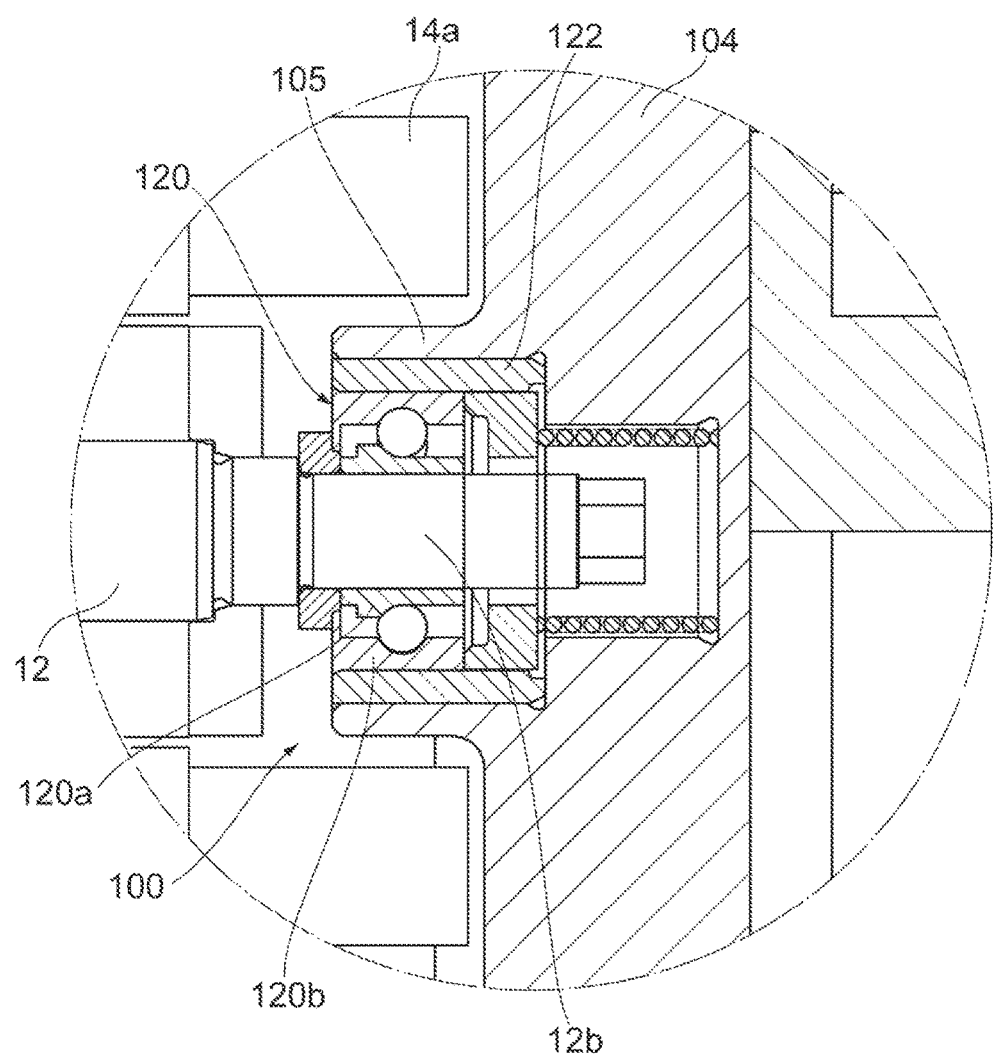
FIG. 4 is an enlarged sectional view illustrating a bearing portion of a rotary machine according to a comparative example.

In the electric supercharger 1 of this embodiment, the protruding portion 22b protruding toward the end wall 4 is provided separately from the surrounding portion 22a surrounding the ball bearing 20, and the protruding portion 22b is fitted to the holding portion 33. Therefore, the bearing sleeve 22 and the holding portion 33 do not overlap each other on the outside in the radial direction D2 of the ball bearing 20, and for example, the cylindrical portion 105 of the comparative example illustrated in FIG. 4 may not be provided such that a space S on the outside of the ball bearing 20 is secured. As a result, a space in the radial direction between the motor stator and the ball bearing 20 can be secured, which is advantageous in terms of layout. Therefore, for example, the outer diameter of the motor stator can be reduced. Furthermore, it is possible to increase the outer diameter of the ball bearing without changing the size of the motor stator.

Figure 3:
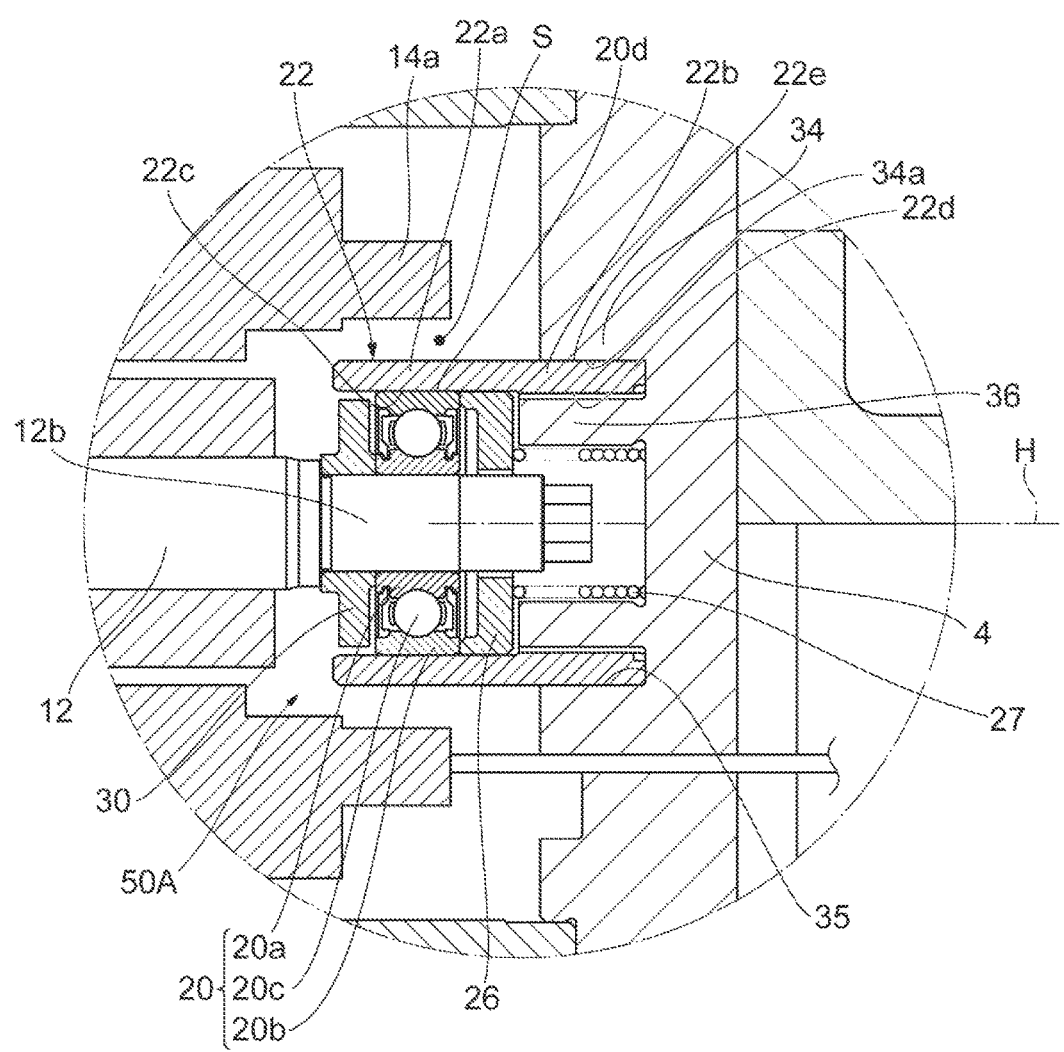
FIG. 3 is an enlarged sectional view illustrating a bearing portion of a rotary machine according to a second embodiment of this disclosure, and is view corresponding to FIG. 2.

Depending on the relationship between the coefficients of linear expansion of the ball bearing 20 and the bearing sleeve 22, an aspect different from the bearing structure 50 may also be employed. A bearing structure 50A of the electric supercharger 1 according to a second embodiment will be described with reference to FIG. 3. As illustrated in FIG. 3, in the bearing structure 50A, the end wall 4 is provided with a cylindrical portion 36 having the rotation axis H as the center, and the spring 27 is accommodated in the cylindrical portion 36. The spring receiver 26 is disposed between the cylindrical portion 36 and the ball bearing 20.

A cylindrical holding portion 34 having the rotation axis H of the rotating shaft 12 as the center is provided on the outer circumferential side of the cylindrical portion 36. The holding portion 34 forms a portion of the end wall 4. An inner circumferential surface 34a of the holding portion 34 extends in the axial direction D1.

The annular groove 35 having the rotation axis H as the center is provided on the inner circumferential side (the rotation axis H side) of the holding portion 34. The end portion of the protruding portion 22b is disposed in the groove 35, and the above-mentioned cylindrical portion 36 is disposed in the end portion. The protruding portion 22b and the holding portion 34 provided in the end wall 4 overlap each other in the radial direction D2 of the rotating shaft 12. That is, the protruding portion 22b is disposed on the inside in the radial direction D2, and the holding portion 34 is disposed on the outside in the radial direction D2. The bearing sleeve 22 is fixed to the end wall 4 by fitting the protruding portion 22b into the holding portion 34. An inner circumferential surface 22e of the protruding portion 22b comes in pressing contact with the inner circumferential surface 34a of the holding portion 34 (the outer circumferential surface of the groove 35). The bearing sleeve 22 is press-fitted and fixed to the holding portion 34 by, for example, a cold fit (shrink fit).

In the bearing structure 50A, the coefficient of linear expansion of the bearing sleeve 22 is larger than the coefficient of linear expansion of the holding portion 34. The protruding portion 22b of the bearing sleeve 22 having the larger coefficient of linear expansion is disposed on the inside of the holding portion 34 in the radial direction D2. As described above, the protruding portion 22b and the holding portion 34 are arranged in an arrangement relationship (the relationship between the inside and the outside) such that the interference therebetween in the radial direction D2 is increased by such a temperature change.

As described above, since the one having a larger coefficient of linear expansion is disposed on the inside in the radial direction D2, during the operation of the electric supercharger 1, even when the protruding portion 22b and the holding portion 34 thermally expand due to the rise in the internal temperature, the interference in the fit between the protruding portion 22b and the holding portion 34 is increased. This prevents the bearing sleeve 22 from coming off.

Even in the electric supercharger 1, the protruding portion 22b protruding toward the end wall 4 is provided separately from the surrounding portion 22a surrounding the ball bearing 20, and the protruding portion 22b is fitted into the holding portion 34. Therefore, the bearing sleeve 22 and the holding portion 34 do not overlap each other on the outside in the radial direction D2 of the ball bearing 20, and the space S on the outside of the ball bearing 20 is secured. As a result, a space in the radial direction between the motor stator and the ball bearing 20 can be secured, which is advantageous in terms of layout.

While the embodiment of this disclosure has been described above, the present invention is not limited to the embodiment. In the above embodiment, a case where the rotary machine is of a type in which the temperature of the bearing sleeve 22 and the end wall 4 rises during the operation of rotating the rotating shaft 12 is described, but the embodiment is not limited to such a case. In a case where the rotary machine is of a type in which the temperature of the bearing sleeve 22 and the end wall 4 drops during the operation of rotating the rotating shaft 12 (for example, in the case of a rotary machine used in a cryogenic refrigeration facility), one of the protruding portion 22b and the holding portion having a larger coefficient of linear expansion is disposed on the outside the radial direction D2. In this case, during the operation of the rotary machine, even when the protruding portion 22b and the holding portion are thermally contracted due to the drop in the internal temperature, since the one having a larger coefficient of linear expansion is disposed on the outside in the radial direction, the interference in the fit between the protruding portion 22b and the holding portion is increased. Therefore, the bearing sleeve 22 is prevented from coming off.

In the embodiment, the bearing structures 50 and 50A at the base end portion 12b of the rotating shaft 12 have been described. However, the present invention can also be applied to the tip end portion 12a of the rotating shaft 12 to which the compressor impeller 8 is attached. That is, the bearing sleeve 21 surrounding the ball bearing 20 may be provided with a protruding portion protruding toward the compressor impeller 8, and the protruding portion may be fitted to the cylindrical portion of the bearing surrounding portion 23 (end wall).

The bearing is not limited to the grease lubrication type ball bearing. For example, a ball bearing employing another lubrication type (oil lubrication or the like) may also be used. The bearing is not limited to the radial bearing and may also be a thrust bearing.

The structure of the present invention can be applied to any rotary machine in which a bearing is press-fitted to a rotating shaft. For example, the present invention can be applied to a type of electric supercharger in which rotation is assisted by a motor provided with a turbine, or can be applied to a general supercharger other than the electric supercharger. Furthermore, the present invention is not limited to a rotary machine provided with a compressor, and can also be applied to a generator that generates electric power using a turbine.

INDUSTRIAL APPLICABILITY

According to some aspects of this disclosure, a space on the outside of a bearing can be secured in the radial direction of a rotating shaft.

REFERENCE SIGNS LIST 1 electric supercharger (rotary machine)
2 housing
4 end wall
12 rotating shaft
13 rotor portion
14 stator portion
14a lead wire
20 ball bearing (bearing)
20a inner race
20b outer race
21 bearing sleeve
22 bearing sleeve
22a surrounding portion
22b protruding portion
33 holding portion
34 holding portion
D1 axial direction
D2 radial direction

The invention claimed is:

1. A rotary machine comprising:
a rotating shaft supported with respect to an end wall of a housing;
a bearing which is attached to the rotating shaft and rotatably supports the rotating shaft in the housing;
a cylindrical holding portion which is provided in the end wall of the housing and extends in an axial direction of the rotating shaft toward the bearing;
an annular groove provided in the end wall of the housing radially outward from the cylindrical holding portion; and
a cylindrical bearing sleeve which is fixed to the holding portion and surrounds the bearing, wherein
the bearing sleeve includes a surrounding portion that surrounds the bearing and a protruding portion that protrudes from the surrounding portion toward the end wall,
the protruding portion and the holding portion overlap each other in a radial direction of the rotating shaft, and the bearing sleeve is fixed to the end wall by fitting the protruding portion into the holding portion, a coefficient of linear expansion of the bearing sleeve is different from a coefficient of linear expansion of the holding portion, one of the protruding portion and the holding portion having a larger coefficient of linear expansion is disposed radially inward of the other of the protruding portion and the holding portion, and an end of the protruding portion is disposed in the annular groove.

2. The rotary machine according to claim 1, wherein the protruding portion protrudes from the surrounding portion in the axial direction of the rotating shaft.

3. The rotary machine according to claim 1, wherein a hardness of the bearing sleeve is equal to a hardness of an outer circumferential portion of the bearing.

4. A rotary machine comprising:

a rotating shaft supported with respect to an end wall of a housing;

a bearing which is attached to the rotating shaft and rotatably supports the rotating shaft in the housing;

a cylindrical holding portion which is provided in the end wall of the housing and extends in an axial direction of the rotating shaft toward the bearing;

an annular groove provided in the end wall of the housing radially inward from the cylindrical holding portion; and a cylindrical bearing sleeve which is fixed to the holding portion and surrounds the bearing, wherein the bearing sleeve includes a surrounding portion that surrounds the bearing and a protruding portion that protrudes from the surrounding portion toward the end wall, the protruding portion and the holding portion overlap each other in a radial direction of the rotating shaft, and the bearing sleeve is fixed to the end wall by fitting the protruding portion into the holding portion, a coefficient of linear expansion of the bearing sleeve is different from a coefficient of linear expansion of the holding portion, one of the protruding portion and the holding portion having a larger coefficient of linear expansion is disposed radially inward of the other of the protruding portion and the holding portion, and an end of the protruding portion is disposed in the annular groove.

5. The rotary machine according to claim 4, wherein the protruding portion protrudes from the surrounding portion in the axial direction of the rotating shaft.

6. The rotary machine according to claim 4, wherein a hardness of the bearing sleeve is equal to a hardness of an outer circumferential portion of the bearing.

7. A rotary machine comprising:

a rotating shaft supported with respect to an end wall of a housing;

a bearing which is attached to the rotating shaft and rotatably supports the rotating shaft in the housing;

a cylindrical holding portion which is provided in the end wall of the housing and extends in an axial direction of the rotating shaft toward the bearing;

a cylindrical bearing sleeve which is fixed to the holding portion and surrounds the bearing; and a spring receiver disposed between the bearing and the cylindrical holding portion in the axial direction of the rotating shaft, wherein the bearing sleeve includes a surrounding portion that surrounds the bearing and a protruding portion that protrudes from the surrounding portion toward the end wall, the protruding portion and the holding portion overlap each other in a radial direction of the rotating shaft, and the bearing sleeve is fixed to the end wall by fitting the protruding portion into the holding portion, a coefficient of linear expansion of the bearing sleeve is different from a coefficient of linear expansion of the holding portion, and one of the protruding portion and the holding portion having a larger coefficient of linear expansion is disposed radially inward of the other of the protruding portion and the holding portion.

8. The rotary machine according to claim 7, wherein the protruding portion protrudes from the surrounding portion in the axial direction of the rotating shaft.

9. The rotary machine according to claim 7, wherein a hardness of the bearing sleeve is equal to a hardness of an outer circumferential portion of the bearing.

* * * * *